United States Patent [19]

Tomasi

[11] Patent Number: 4,503,433
[45] Date of Patent: Mar. 5, 1985

[54] RANGE MEASUREMENT BY MEANS OF FREQUENCY MODULATED CONTINUOUS WAVE RADAR

[75] Inventor: Jean P. Tomasi, Velizy, France

[73] Assignee: U.S. Philips Corporation, New York, N.Y.

[21] Appl. No.: 330,293

[22] Filed: Dec. 14, 1981

[30] Foreign Application Priority Data

Dec. 12, 1980 [FR] France ............... 80 26438

[51] Int. Cl.³ .................. G01S 13/34; G01S 13/26
[52] U.S. Cl. .................. 343/7.5; 343/12 R; 343/14
[58] Field of Search .......... 343/14, 12 R, 7.5

[56] References Cited

U.S. PATENT DOCUMENTS

| 4,044,355 | 8/1977 | Edvardsson | 343/14 |
| 4,238,795 | 12/1980 | Schiek et al. | 343/14 |
| 4,276,549 | 6/1981 | Tomasi | 343/7.5 |
| 4,359,902 | 11/1982 | Lawless | 343/14 |
| 4,367,473 | 1/1983 | Marin et al. | 343/7.5 X |

OTHER PUBLICATIONS

R. Jacobson, B. Schiek, W. Schilz; *Microwave Distance Meter with ±2.5 μm Resolution;* pp. 203–207; 5th European Microwave Conf.; Hamburg, Germany (Sep. 1–4 1975).

*Primary Examiner*—T. H. Tubbesing
*Assistant Examiner*—Gilberto Barrón, Jr.
*Attorney, Agent, or Firm*—Robert J. Kraus

[57] ABSTRACT

A continuous wave FM range measuring apparatus for transmitting a signal F which is linearly modulated by a sawtooth signal over a frequency excursion $\Delta F$ during a duration T and which has a central frequency $f_1$. A phase loop is provided for stabilizing $\Delta F$ and $f_1$ with the precision of a quartz oscillator. A mixer produces a beat signal $f_b$ between the transmitted signal F and a received signal F' reflected from an object. The frequency $f_b$ and the phase $\phi b_o$ of $F_b$ at the beginning of the sawtooth ramp are measured. The distance is calculated, preferably by means of a microprocessor (10), by first calculating an approximate value $d_1$ of the distance d to be determined between the radar and the object as a function of $\Delta F$, $f_b$ and T. Then a more precise second value $d_2$ of d is calculated from $d_1$, $\phi_{bo}$ and the value $f_o$ of F at the beginning of the ramp. In a preferred embodiment, the level of a liquid in a container is measured.

10 Claims, 8 Drawing Figures 4,503,433

RANGE MEASUREMENT BY MEANS OF FREQUENCY MODULATED CONTINUOUS WAVE RADAR

BACKGROUND OF THE INVENTION

The invention relates to a method for accurately determining the distance d of an object with respect to and by means of an FM-CW radar comprising a VCO generating a high frequency signal F having an instantaneous frequency f whose frequency is linearly modulated by a modulator GDS. The modulator generates a sawtooth supply voltage DDS, both having a duration T during which the signal F describes a linear frequency excursion of a predetermined, constant, accurately known value $\Delta F$. A transmitting-receiving aerial and a mixer receive the transmitted signal F and a received signal F' having an instantaneous frequency f' after reflection from the object whose distance d is to be measured. The mixer produces a signal Fb having a frequency $f_b$.

In accordance with one embodiment of the invention the duration T of each sawtooth voltage (output of GDS) and the frequency (output of VCO) is predetermined, constant and known accurately.

In accordance with a further embodiment the radar of the FM-CW type comprises a control loop arranged between the output of the mixer and the input of the modulator GDS for keeping the frequency $f_b$ of the mixer output signal Fb substantially constant.

The invention also relates to a range measuring apparatus for putting into effect the method covering the above-described embodiments.

In the case in which the radar comprises a control loop it is of a type such as disclosed in, for example, Applicant's French Patent Specification No. 1,557,670 corresponding to U.S. Pat. No. 3,588,899.

The invention is preferably used for measuring comparatively short distances. Assuming the values of the parameters $f_1$ (centre frequency of the signal F) and $\Delta F$ of the radar to be fixed it is possible to define a small range of maximum distances, for example from $d_o$ to 1.1 $d_o$, for which the precision obtained in measuring d is substantially the same as the precision with which it is possible to measure f, for example $10^{-4}$. Outside this range the invention can no longer be used and the precision to decreases to $10^{-3}$ and beyond. For values of distances shorter than $d_o$ the absolute value in the measurement of d remains constant, that is to say the relative error increases when d decreases, becoming equal for example at $10^{-3}$ for $d=0.1\ d_o$. Consequently the invention appears to be advantageous for a distance range covering approximately an order of magnitude from 1 to 10 meters, or from 10 to 100 meters, for example.

In a preferred embodiment, the invention may be applied to measuring the level of a liquid, of hydrogen or liquid oxygen, for example in containers which are a few meters high, with an absolute error which is approximately equal to 1 mm.

The basic equation from which the distance can be measured when a FM-CW radar of the above-described radar is used and which is generally used as a radio altimeter is written:

$$f_b/\tau = \Delta F/T \quad (1)$$

in which formula $\tau$ is the period of time required by the wave for travelling the distance 2d between the radar and the object and back to the radar after reflection from the object, that is to say:

$$\tau = 2d/c \quad (2)$$

c being the speed of propagation of the electromagnetic wave.

From the formulae (1) and (2) it is possible to derive the value of d as a function of the values measured for $f_b$, F and T:

$$d = (cf_b/2\Delta F)T \quad (3)$$

When the range measuring apparatus is the apparatus described in French Patent Specification No. 1,557,670, the parameters $f_b$ and $\Delta F$ are maintained at substantially constant values and the distance d is proportional to the duration T of a sawtooth. The precision obtained in measuring d is then equal in a first approximation to the sum of the precisions obtained for $f_b$, $\Delta F$ and T, that is to say an error on the order of $\Delta d/d = 10^{-2}$, while the relative error of $f_b$, $\Delta F$ and T are of the order of $10^{-3}$, which is already difficult to obtain in the prior art. It is also conceivable that a wave is transmitted whose frequency varies linearly in the form of a sawtooth having a frequency excursion $\Delta F$ and a duration T, which are kept constant. In the latter case, $\Delta F$ and T become parameters, and $f_b$ becomes the variable as a function of the distance d, in formula (3), the precision of d remaining the same as described above for the case where T is the variable. It should be noted that in the two cases considered above (T variable or $f_b$ variable as a function of d), the value of $f_b$, during the time T in which the excursions of a sawtooth occur, may be considered as being constant, its variation being many orders of magnitude smaller than the smallest errors considered in the present text. This results from the fact that the relative speed between the object and the radar, for the considered applications, is very low, compared to the repetition rate of the sawtooths.

SUMMARY OF THE INVENTION

An object of the present invention is to obtain an improved precision of the measurement of $f_b$, $\Delta F$ and T, particularly by using period meters or quartz oscillators.

A further object of the invention is to obtain for d a precision which is of the same order as the precision obtained for $f_b$, $\Delta F$ and T, respectively. These objects are accomplished by an improvement of the method described in the opening paragraph, characterized in that it comprises the following steps during the duration T of a sawtooth period:

the accurate measurement of the frequency $f_o$ of the signal F and of the phase $\phi_{bo}$ of the signal $F_B$ at an instant $t_o$, the determination of a train of the number N of periods (N being an integer) of the signal $F_b$ accurring during T and the duration $T_1$ of these periods, the calculation of the approximate value of d, denoted $d_1$, on the basis of the values $\Delta F$, T and the values found for N and $T_1$ in the preceding step, the calculation of the approximate value of $\phi$, denoted $\phi_1$, which is roughly the phase shift between the transmitted and received signals on the basis of the values for $f_o$ and $d_1$ found during the preceding steps, the determination of the angle $2k\pi$, k being an integer, actually contained in the angle $\phi$, on the basis of the values $\phi_{bo}$, $\phi_1$ found during the preceding steps, identifying the accurate value of d, denoted $d_2$ in the sum: $\phi_{bo}+2k\pi$, calculating the accurate value of d, denoted $d_2$, on the basis of the values for $f_o$ and $\phi_2$ found during the preceding steps.

When the radar used is of the type described in the third paragraph of the description, the method according to the invention is characterized in that it comprises the additional step of accurately measuring the duration T of the sawtooth period under consideration.

According to the invention, a range measuring apparatus which uses the method described in the foregoing is characterized in that it comprises:

first means for shaping the signal $F_b$ to form a square-wave signal A having the same phase and the same frequency $F_b$, second means for measuring the phase $\phi b_o$ of the square-wave signal of the frequency $f_b$ at an instant associated with the duration t in which the frequency f of the signal F is equal to a predetermined value $f_p$, third means for determining the number N of square-wave signals associated with the signal A and whose number of periods N (N being an arbitrary integer) and duration $T_1$ can be measured with a very high degree of accuracy, fourth means for calculating and displaying the distance d on the basis of the values of the parameters $\Delta F$, $\phi b_o$, $f_p$, N, $T_1$ and T measured during a (each) slope of the sawtooth, the calculation being effected during the time interval separating two consecutive slopes.

The basic idea of the invention is to effect a first measurement of d, denoted $d_1$, on the basis of the formula (3) with an absolute error which is less than one-half wave length of the transmitted signal (that is to say a relative error to $d_1$ which is at least equal to $10^{-3}$). This makes it possible, thanks to a phase measurement which is accurate to 10 degrees of the signal $F_b$, and by using other formulae which follow hereinafter, in which $d_1$ occurs, to obtain after measurement and calculation have been effected, the value of an electric phase shift angle which can attain several thousands of degrees with a precision of the order of $10^{-4}$, and to calculate from the value of this angle and from a specific value of the frequency measured with a precision of the order of $10^{-5}$. This second very precise value of d, denoted $d_2$, is obtained with a precision of approximately $10^{-4}$, the precision obtained for $f_b$, $\Delta F$ and T also being approximately $10^{-4}$.

BRIEF DESCRIPTION OF THE DRAWING

By means of the following description, which is given by way of non-limitative example with reference to the accompanying drawing, it will be better understood how the invention can be put into effect.

FIG. 5b shows a modification of the radar illustrated in FIG. 5a.

DESCRIPTION OF THE PREFERRED EMBODIMENTS

Figure 1:
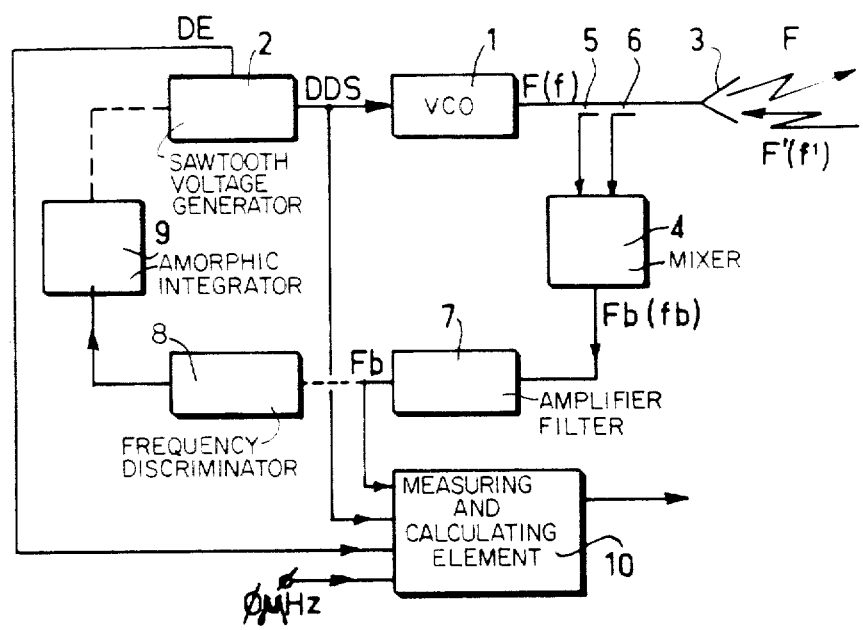
FIG. 1 shows a simplified block diagram of two possible embodiments of the invention.

In FIG. 1, reference numeral 1 represents a voltage controlled oscillator VCO whose input is connected to the output of a sawtooth voltage generator 2, abbreviated to GDS. The VCO generates a high frequency signal F having a frequency F, for example centimeter or decimetric waves, which is applied to a transmitting-receiving aerial 3. A portion of the transmitted signal is conveyed to a mixer 4 by means of a coupler 5. After reflection from an object, not shown, whose distance d to the aerial 3 one wants to measure, a portion of the transmitted signal is received, by the aerial 3 and is partially transmitted to a second input of the mixer 4 by means of a coupler 6. The received signal F' having a frequency f' is delayed by the time $\tau$ with respect to the transmitted signal F, because of the distance travelled to the object and back (2d). The mixer 4 effects a subtractive mixing of the signals it receives and produces at its output a beat signal whose frequency $f_b$ is: $f_b=f-f'$. This signal is filtered and amplified via the amplifier-filter 7 which produces the signal Fb of frequency $f_b$. The elements 1 to 7 form the conventional, known portion of a linear frequency-modulation radar FM-CW. The generator 2 may be self-contained and may generate a sawtooth voltage signal whose linear excursion $\Delta V$ and duration T corresponding with this excursion are constant. The sawtooths are, for example, asymmetrical, ascending and separated by low voltage plateaus $V_1$ and high voltage plateaus $V_2$. With this signal there corresponds a signal F at the output of the VCO1 constituted by sawtooths of a constant ascending frequency excursion $\Delta F$, having duration T and being separated by constant low frequency plateaus $f_o$ and constant high frequency plateaus $f_2$ such as $\Delta F = F_2 - F_o$.

Preferably, arranged between the output of the mixer 4 and a control input of the generator 2 the radar includes a control loop which has for its function to keep the frequency $f_b$ constant by having the slope of the sawtooth vary when the distance d varies. This loop which is shown in FIG. 1 by means of a broken line comprises the amplifier-filter 7, a frequency discriminator 8 having a constant central frequency $f_{bo}$, and an amorphic-integrator 9. When the distance d varies, the frequency $f_b$ is kept substantially equal to $f_{bo}$ and the slope of the sawtooth varies, $\Delta F$ remaining constant, in such a manner that the duration T is proportional to the distance d in a first approximation. For more details on the construction and the mode of operation of this radar reference is made to the above-mentioned patent specification No. 1,557,670. To put the invention into effect, the radar of FIG. 1 provides in a continuous manner, by means of generator 2, a logic signal DE which is equal to "1" during the excursion of the sawtooth and to "0" during the plateau. The signals FB, DDS and DE are transmitted to a measuring and calculating element 10 which may be in the form of a wired logic circuit, but which is preferably a microprocessor and which also receives a fast clock signal ∅ having a frequency of, for example, 10 MHz.

Starting from the formula (3), the invention has the object, in a first stage, to obtain the values of the parameters $f_b$, $\Delta F$ and T with an improved precision, which precision must be substantially the same for each one of the three parameters. It is known to measure T with a very high precision by using a fast digital counter which receives the clock signal and the signal DE as described hereafter. When the precision of T is, for example, on the order of $10^{-4}$, the invention has the aim of measuring $\Delta F$ and $f_b$ with a comparable precision. As far as $\Delta F$ is concerned, the value which would be measured starting from the signal DDS by applying the formula $\Delta F = f_2 - f_o$ being insufficient, it is necessary to add to the radar a device for adjusting $\Delta F$ to a predetermined value with the aid of a quartz oscillator, as will be described hereinafter with reference to FIG. 5. $\Delta F$ is then introduced as an exterior constant in the element 10. The accurate measurement of $f_b$ is effected from the signal Fb by counting an integral number N of sine waves of the signal Fb which form a train within the duration T, concomitantly measuring the duration $T_1$ of this train which can be done with the same precision as T. The precision obtained is high because $T_1$ is long and in a majority of cases it is possible to make $T_1$ approximately equal to 0,9 T Thus, starting from the formula (3) the precise value of d is obtained, denoted $d_1$, which may be written as:

$$d_1 = cNT/2\Delta f T_1 \quad (4)$$

wherein $$f_b = N/T_1 \quad (5)$$

The invention has for its object, in combination with the foregoing, to determine the distance d, denoted $d_2$, with a precision which is several times greater than that obtained for $d_1$, at least over a certain range of distances. The phase $\phi b_o$ of signal Fb and the frequency $f_o$ of the signal F are measured at the instant $t_o$ which is chosen arbitrarily during the duration. Advantageously, the instant $t_o$ marks the beginning of the duration T, at which instant the frequency of the signal F is equal to the predetermined frequency $f_b = f_o$ of the low plateau and may be known with accuracy, being obtained from the quartz oscillators as described hereinafter with reference to FIG. 5.

The formulae and the calculations by means of which it is possible to obtain $d_2$ are as follows:

$$\phi = 2\pi f_o \tau = 4\pi f_o(d/c) \quad (6)$$

$\phi$ being the angle which may comprise several cycles and which represents with a very good approximation roughly the phase shift between the signal F and F' at the instant $t_o$, having as its origin the point of intersection between the right-hand member of the equation $f(t) = \Delta F/Tt$ and the time axis. This rough phase shift represents the electric angle though which the signal F passes during the time $\tau$. The formulae (6) gives $\phi$ in a first approximation only, because it is based on the approximation that the frequency F remains constant and equal to $f_o$ during the duration $\tau$ which proceeds the instant $t_o$. The error thus introduced for $\phi$ is however very small, for example only to the order of $10^{-8}$ when for f a frequency in the order of 10 GHZ and for $f_b$ a frequency to the order of 100 Hz are chosen, and may be disregarded. The angle $\phi$ may therefore be written:

$$\phi = \phi_{bo} + 2k\pi \quad (7)$$

$\phi b_o$ being the phase of the signal $F_b$ at the instant $t_o$ and k being an integer. When the equations (6) and (7) are combined it is obtained that:

$$d = c/4\pi f_o(\phi_{bo} + 2k\pi) \quad (8)$$

that is to say by introducing in the formula (8) the value $d_1$ of d:

$$k = 2f_o d_1/c - \phi_{bo}/2\pi \quad (9)$$

if the values for $f_o$, $d_1$, $\phi b_o$ were the exact values the integral value searched for would be obtained for k; $f_o$, $d_1$ and $\phi b_o$ being values obtained from measurements, a non-integral value k', close to k is actually obtained in accordance with the formula (9) instead of k. The object of the invention is that these measurements would be sufficiently accurate in order to obtain for k' a non-integral value of k, such that:

$$k - \tfrac{1}{2} < k' < k + \tfrac{1}{2} \quad (10)$$

the constraints to be satisfied in order that condition (10) is fulfilled are described hereinafter.

It thus becomes possible to determine the value of k from the value of k', which makes it possible to use the formulae (8) for the measurement of d with a high accuracy. Actually, the absolute error for $\phi$ is then the same as the absolute value for $\phi b_o$, that is to say, for example, $\pm 10$ degrees. In contrast therewith, the relative error of $\phi$ is, assuming $f_o = 10$ GHZ and d = 10 m, because of formula (6) on the order of $4.10^{-5}$. The value of $f_o$ is obtained with accuracy from a quartz oscillator and is, for example, on the order of $10^{-5}$. The accuracy obtained for $d_2$ is on the order of $5.10^{-5}$. It should be noted that if the absolute value of $\phi b_o$ would be five times smaller the relative error of $d_2$ would also be approximately five times smaller, that is to say on the order of $10^{-5}$.

Figure 2:
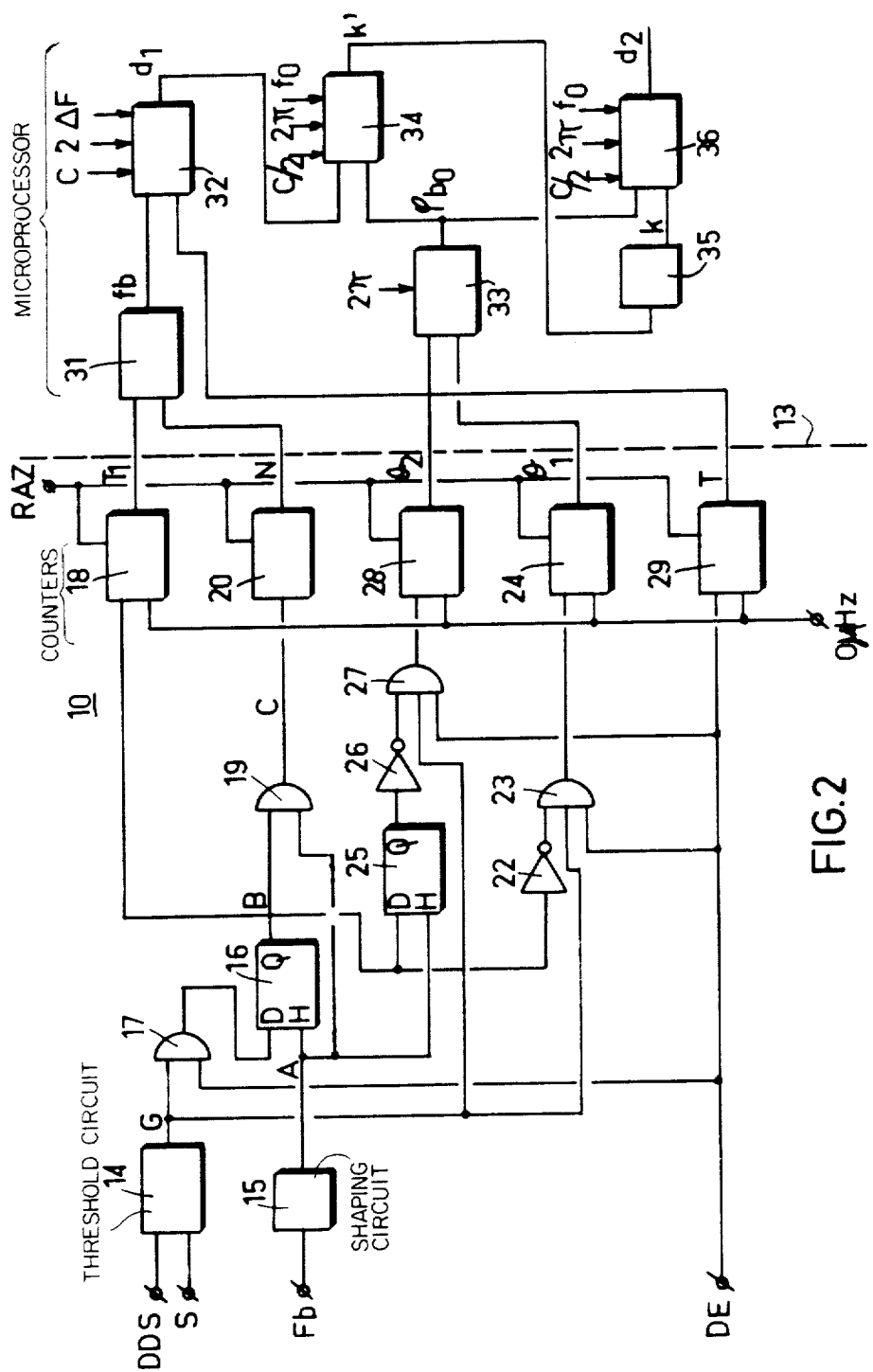
FIG. 2 shows a block diagram of a range measuring apparatus for putting the procedure in accordance with the invention into effect.
Figure 3:
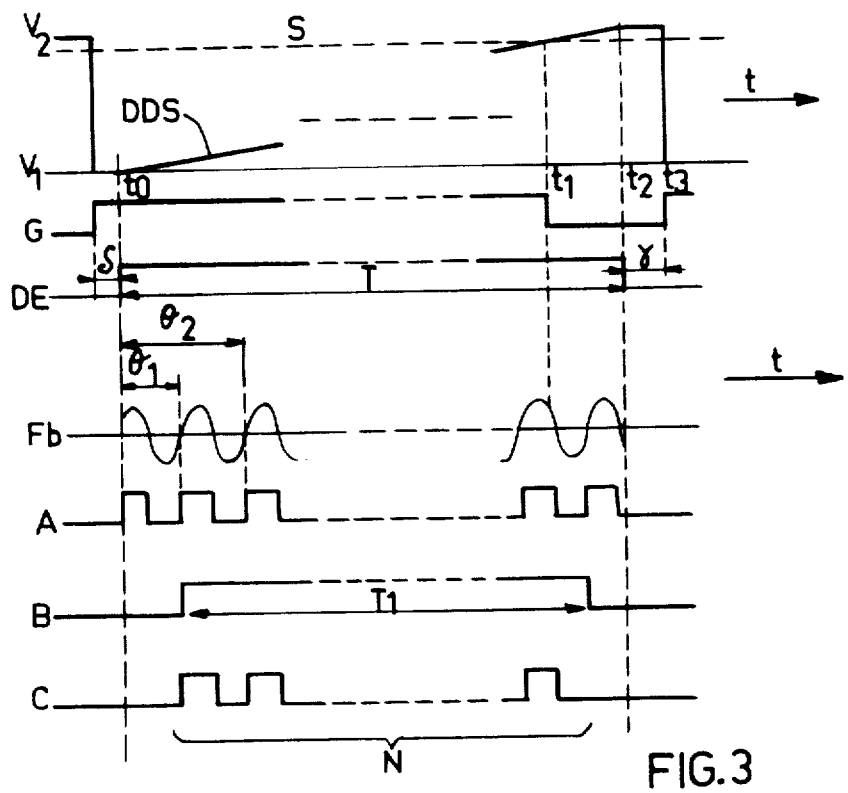
FIG. 3 shows time diagrams of certain signals of the diagram of FIG. 2 which explain the measurement of $f_b$ and T.

FIGS. 2 and 3 illustrate an embodiment of the invention by means of which it is possible to measure certain parameters and to determine the distance $d_2$ from the signals DDS, FB, DE indicated in FIG. 1 and from a threshold signal S and the values of $\Delta F$ and $f_o$ which are introduced as constants.

FIG. 2 shows the element 10 of FIG. 1. The portion of FIG. 2 located to the left of a broken line 13 shows the measuring portion of the element 10, and to the right of the line 13 the calculating portion, advantageously a microprocessor.

FIG. 3 shows time diagrams of certain signals which are received or generated by the measuring portion of the element 10. A threshold circuit 14 (FIG. 2) receives the signal DDS which is, for example, in the form of a repetitive, increasing voltage slope which is limited by two plateaus, a low plateau having the constant value $V_1$ and a high plateau having a constant value $V_2$. A continuous voltage signal S which is slightly lower than $V_2$ is also applied to circuit 14 which, in a continuous manner, produces a logic voltage signal G, which is equal to "1" when the voltage of DDS is lower than the voltage of S and equal to "0" in the opposite case. On the other hand, the sinusoidal signal FB is converted, in a shaping circuit 15, into a square-wave signal A having the same frequency and the same phase. The signal DE generated by the generator 2 (FIG. 1) is equal to "1" during the voltage slope of DDS lying between $V_1$ and $V_2$, and to "0" in all other circumstances. A bistable triggering circuit, in this case a flip-flop 16 receives at its input D a logic signal produced by a logic AND-gate circuit 17 whose two inputs receive the signal G and the signal DE. The triggering circuit 16 receives the signal A at its clock input and produces at its Q output a signal B which is in the logic "1" state during two leading edges of the signal A, during the duration $T_1$. The time $T_1$ is measured by means of a fast counter 18 which receives the clock signal ∅ and its value is transmitted to the calculation portion in series or parallel form. To calculate the number N, the signals A and B are transmitted to an AND-gate circuit 19 which applies a train of N pulses to the input of a counter 20. After having been shaped in 20 the N pulses are transmitted in series or parallel form to the calculation portion.

Figure 4A:
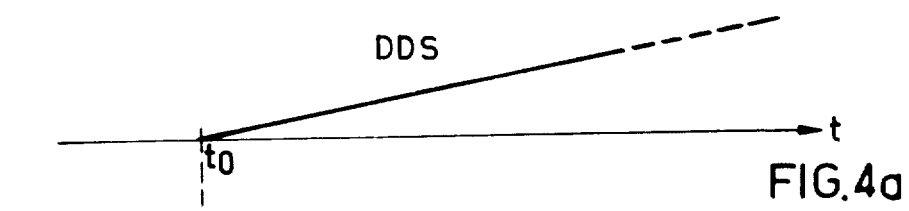
FIGS. 4a and 4b represent time diagrams explained in the phase measurement $\phi b_o$ by means of the apparatus shown in FIG. 2.
Figure 4B:
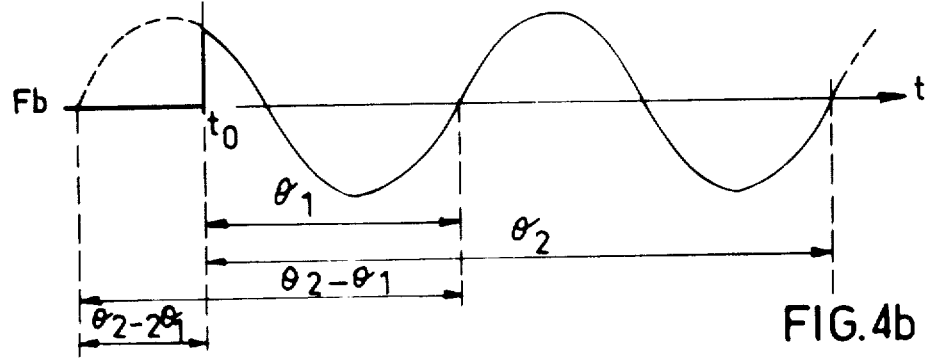

Measuring the phase shift $\phi b_o$ is effected as will be described hereinafter with reference to FIGS. 4a and 4b which illustrate on a larger scale the signals DDS and FB of FIG. 3. The instant chosen for measuring $\phi b_o$ is the instant $t_o$ at which the voltage slope has the value $V_1$, and the signal F has the predetermined frequency $f_b = f_o$.

Let $\theta_1$ be the time, from $t_o$, which elapses until the first zero passage by the increasing values of the signal Fb (first leading edge of A) and $\theta_2$ the time which elapses until the second leading edge of A occurs. The period of Fb is equal to $\theta_2 - \theta_1$ and the time of the phase shift $\phi b_o$ is equal to $\theta_2 - 2\theta_1$. From this it follows that the phase shift $\phi b_o$ is equal to $$\phi_{bo} = 2\pi(\theta_2 - 2\theta_1)/(\theta_2 - \theta_1) \quad (11)$$

In order to generate a logic signal which is equal to "1" only during the duration $\theta_1$ the signal B is inverted by an inverter circuit 22, the signal G and the signal DE are transmitted to an AND-gate circuit 23 whose output signal is applied to a fast counter 24 which effects the measurent of $\theta_1$ in the same way as counter 18 measures $T_1$. The duration $\theta_2$ is generated in a similar manner. A flip-flop D25 which receives the signal B at its input D and the signal A at its clock input produces a signal whose first leading edge coincides with the end of the duration $\theta_2$. This signal is inverted by an inverter circuit 26 and transmitted, as are also the signals G and DE to an AND-gate circuit 27 whose output is in the logic "1" state during $\theta_2$. Like the durations $T_1$ and $\theta_1$, $\theta_2$ is measured by a fast counter 28. Similarly, duration T is measured, if required, by a fast counter 29 in like manner to the counters 18, 24 and 28. It is alternatively possible to choose as instants at which $\phi b_o$ and $f_o$ are measured an instant at which the signal $F_b$ passes through "0" with increasing values, that is to say any arbitrary instant of the leading edge of the signal A. In that event, $\phi_{bo}$ which is zero as the result of this choice need not be measured. In contrast therewith, the value of F must be measured at the instant by means of a quartz period meter.

Resetting the counters 18, 20, 24, 28, 29 to zero is effected by a signal RAZ which can be generated in known manner by the radar at any instant between the instants $t_2$ which indicates the end of the voltage slope of the signal DDS and $t_o$ which indicates the start of the following slope. Preferably, resetting to zero is effected at the instant $t_3$ which is the instant at which the signal DDS passes from the maximum value to the minimum value (passage from $V_2$ to $V_1$ when the signal DDS comprises plateaus). When the right-hand portion of FIG. 2 is a microprocessor, the values of $T_1$, N, $\theta_2$, $\theta_1$ and T are transmitted to interface circuits (input-output ports) and the microprocessor is programmed in known manner to process these translated numbers in parallel on the data bus in accordance with the following sequence:

calculating the frequency $f_b$ in accordance with formula (5) symbolized in 31, FIG. 2;

calculating the distance $d_1$ in accordance with the formula (4) symbolized by the block 32 which receives furthermore the variable data $f_b$ and T of the constants c, 2 and the value of $\Delta F$ introduced as a constant, these values being stored in a read-only memory (ROM). It should be noted that in the event that T is fixed, its measurement, in 29, is not necessary and its value is therefore directly introduced in 32 by way of constants.

calculating the angle $\phi_{bo}$ in accordance with the formula (11), symbolized by the block 33 which receives the variables $\theta_1$ and $\theta_2$ and the constant $2\pi$;

calculating the non-integral value of k by means of the formula (9) which is schematically represented by the block 34 which receives the variable $d_1$ and $\phi_{bo}$, the constants c/2 and $2\pi$ and the value of $f_o$ which is processed as a constant and stored in a ROM;

calculating k by means of a round-off circuit 35 which identifies to k the integral number which is closest to the value obtained at the output of 34;

calculating the distance $d_2$ from the formula (8) which is symbolized by the block 36 which receives the variable $\phi b_o$ and k and the constants c/2, $2\pi$ and $f_o$.

Thereafter, the value of $d_2$ is displayed by any known means. The above-mentioned calculations are preferably effected quickly in order to be effected during the periods of time which separate to consecutive ascending edges of the signal DDS. It is therefore possible to repeat the measurement of $d_2$ for each slope of the transmission signal. These calculations may alternatively be realized in wired logic. Even in the last-mentioned case each one of the four operations +, −, ×, % is preferably effected in a single circuit to which different parameters are presented sequentially in the form of operators in order to obtain the desired result described above.

The preceding assumes that the condition (10) is fulfilled. For this it is necessary that the measurement of $d_1$ is sufficiently accurate, as indicated in the following error calculation:

To an error in the measurement of $T_1$ their corresponds an angular error d committed on the N sign waves counted, such that:

$$\frac{dT_1}{T_1} = 2 \frac{d\zeta}{2\pi} \cdot \frac{1}{N} \quad (12)$$

The factor 2 results from the fact that the errors committed at the start and at the end of $T_1$ are independent and may accumulate, $d\zeta$ being the error committed either at the beginning, or at the end of the angle $\zeta$. The formula (12) may be written:

$$d\zeta = \pi N/T_1 dT_1 \quad (13)$$

Moreover, the derivative of $d_1$ with respect to $T_1$ on the basis of formula (4) is written, leaving the sign out of account:

$$d\, d_1 = \frac{c\, N\, T}{2\, \Delta F\, T_1^2}\, dT_1 \qquad (14)$$

that is to say, taking formula (13) into account:

$$d\, d_1 = \frac{c\, T}{2\pi\, T_1\, \Delta F}\, d\xi \qquad (15)$$

On the other hand, to profit from the additional accuracy resulting from the phase measurement—use of formula (8), it is necessary that the measurement of the frequency $f_o$ is sufficiently accurate in order that $k'$—formula (9)—may be calculated and that k may be determined as a function of $k'$ without ambiguity, that is to say that the error of $d_1$ must be such that:

$$dd_1 < \lambda_o/2 \qquad (16)$$

$\lambda_o$ being the wave length of the high frequency signal having the frequency $f_o$, that is to say:

$$dd_1 < c/2f_o \qquad (17)$$

by combining the formula (15) and (17):

$$d\xi < \pi\, \frac{T_1}{T} \cdot \frac{\Delta F}{f_o} \qquad (18)$$

as described in the foregoing, the values of $T_1$ and of T may be very close to each other. It is important to choose the threshold S which is as close as possible to the value $V_2$ (see FIG. 3) taking care that the value of $f_b$ is sufficiently large for the signal Fb to describe at least a sign wave during the duration $t_1$ to $t_2$. As the relation $T_1/T$ may be considered, in a first approximation, to be equal to unity, the inequality (18) indicates that in order to satisfy the condition (10), it is sufficient to obtain for the angle $\zeta$ (N sine waves of the signal Fb) an accuracy, expressed in gradients, which is less than $\pi\theta F/f_o$, that is to say, for example, an accuracy to the order of $\pi/10$ (18°) if $f_o$ is taken equal to 10 $\Delta F$. Such an accuracy is easy to obtain. In fact, the precise measurement of $T_1$ described in the foregoing implies a precision of $\zeta$ to the order of a few degrees.

It will also be seen that the precision obtained for $d_2$ is, deriving formula (8) with respect to $\phi_{bo}$ and disregarding the error of $f_o$:

$$d\, d_2 = \frac{c}{4\pi\, f_o}\, d\phi_{bo} \qquad (19)$$

the fomula (19) can be compared with the formula (15). If in a first approximation it is considered that: $d\phi_{bo} \simeq d\zeta$ and that: $T/T \simeq 1$ it appears that the compared accuracies of $d_2$ and $d_1$ are in the ratio:

$$\frac{d\, d_2}{d\, d_1} = \frac{\Delta F}{2 f_o} \qquad (20)$$

the ratio $\Delta F/f_o$ is in an advantageous manner taken to be as small as possible, it being varified that the formula (18) is satisfied for the overall range of distances to be measured.

The error calculations effected in the preceding paragraphs apply in so far as the values for $f_o$ and $\Delta F$ can be obtained with the precision of a quartz oscillator, that is to say with an error less than or equal to the error obtained for the other parameters or variables. Hereinafter, with reference to FIG. 5a, a radar will be described by means of which it is possible, in accordance with the invention, to obtain values for $f_o$ and $\Delta F$ with such an accuracy.

Figure 5A:
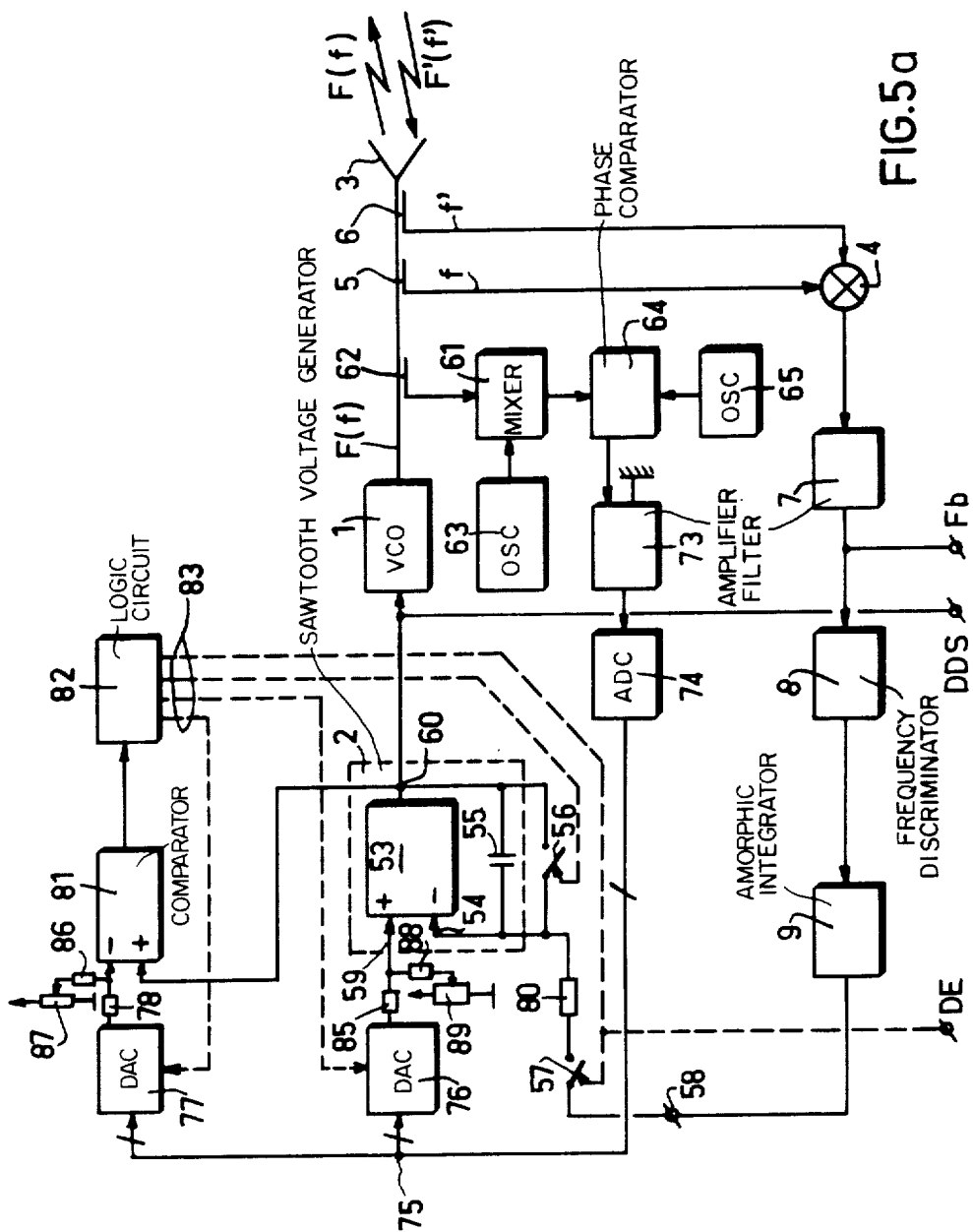
FIG. 5a shows the block diagram of a FM-CW radar comprising a control loop for keeping the frequency $f_b$ constant as well as a phase loop by means of which it is possible to obtain a value $\Delta F$ and a central frequency value $f_1$ of the signal F, which are kept constant with the precision of a quartz.

FIG. 5a shows the main components of the radar shown in FIG. 1 with control loop, these elements having the same function: the VCO 1, the 2, sawtooth voltage generator, the transmitting-receiving aerial 3, the mixer 4, the couplers 5 and 6, the amplifier-filter 7, the frequency discriminator 8 (alternatively called tracking discriminator) and the amorphous integrator 9. The sawtooth voltage generator is formed by an operational amplifier 53 whose output 60 is connected to its inverting input 54 by means of a capacitor 55. The control of the slope of the sawtooth is effected by applying a direct voltage signal to the input 54. On the other hand, an interruptor 56 is arranged in parallel with the capacitor 55 and an interruptor 57 is included in the conductor which connects a control terminal 58 to the inverting input 54 via a resistor 80. When the interruptor 56 is open, the interruptor 57 is closed and as the voltage on the non-inverting input 59 is fixed the operational amplifier 53 functions as an integrator and constitutes a sawtooth voltage generator, the capacitor 55 being charged at a constant rate via the resistor 80. When the voltage on the terminal 58 is negative a signal of an increasing voltage is thus obtained as a function of the time at the output 60 of the amplifier 53, that is to say from generator 2 (which is the case for the radar shown in FIG. 5a) and for a positive voltage at the input a signal with a decreasing voltage at the output. In accordance with the invention, the radar shown in FIG. 5a comprises inter alia detection means for detecting the instant $t_2$ at which the signal F reaches a constant predetermined frequency equal to: $f_1 + f_q$ and to detect the instant $t_o$ at which the signal F reaches a constant predetermined frequency equal to: $f_1 - f_q$. These detection means comprise in the first place a frequency mixer 61 which receives at a first input a fraction of the output signal F via a coupling element 62. On the other hand, a first quartz oscillator 63 applies a signal having a fixed frequency $f_1$ to a second input of the mixer 61 whose output contains a signal having a frequency $|f - f_1|$. A phase comparator 64 receives at a first input the signal having frequency $f - f_1$ and at a second input a signal having a constant frequency $f_q$ produced by a second quartz oscillator 65.

Based on the above-described configuration, the detection of the instants $t_o$ and $t_2$ obtained from the phase comparator 64 may be effected in several manners, one of which is described here below with reference to FIG. 5. FIG. 5a shows a phase loop which comprises, starting from the output of the phase comparator 64 an amplifier-filter 73, an analog-to-digital converter (ADC) 74 and, from a tapping point 75, a digital-to-analog converter (DAC) 76 and a DAC 77. The converters 74 and 76 or 74 and 77 are interconnected by means of several conductors, which is symbolized in the drawing by a single conductor which is cut by an oblique line. There are, for example, 12 conductors one of which is the conductor for the sign bit, by means of which it is possible to count the numbers between −2047 and 2048. The output of the DAC 77 is connected via a resistor 78 to the inverting input of a comparator 81 which is preferably an operational amplifier. The second input of the comparator 81, that is to say the non-inverting input receives the output signal from the operational amplifier 53 which is identical to that of the generator 2. The output of the comparator 81 is connected to the input of a logic circuit 82 comprising time switch and logic gate circuits and which has four control outputs, referenced 83, which outputs provide logic signals in the form of two constant voltage levels representing the logic states "0" or "1". Preferably, the logic circuit 82 comprises two series-arranged monostable circuits, the first monostable circuit being triggered by a leading edge which determines the duration $\lambda$ of the high plateau of the sawtooth and the second monostable circuit being triggered by a trailing edge from the first one which determines the duration $\delta$ of the low threshold of the sawtooth voltage at the output of the generator 2 or the frequency at the output of the VCO. A first and a second output are used to lock or unlock the DACs 77 and 76, respectively. Third and fourth outputs control the opening or the closing of the interruptors 56 and 57, respectively. These four outputs are shown symbolically by means of broken lines 83 and lead from logic gate circuits which are included in the circuits 82, this whole assembly constituting switching and locking means. The output of the DAC 76 is connected to the input 59 of the operational amplifier 53 via a resistor 85. The elements 53 and 81 are, for example, operational amplifiers type $\mu$A 101A, produced by Fairchild. An operational cycle of the radar of FIG. 5a is described below. With a very good approximation, the terminal 58 provides a constant negative voltage, which during the operational stage of the operational amplifier 53 functioning as an integrator, results in an ascending voltage edge 61 and in a high frequency signal the frequency of which varies in a substantially linearly ascending manner at the output of the VCO1. This operation stage is the stage in which DACs 76 and 77 are locked. The interruptor 56 is open and the interruptor 57 is closed under the control of the locking and switching means as explained below. The mixer 61 delivers, prior to the instant $t_2$, a signal having a frequency equal to: $f-f_1$. At the instant $t_2$ the signal F reaches (or would reach) the predetermined value $f_2=f_1+f_q$ and the output signal of the mixer 61 the value $f_q$. At an instant very close to $t_2$ the increasing signal at the non-inverting input of the comparator 81 becomes equal to the signal at the inverting input. While this occurs, the voltage signal at the output of the comparator 81 changes from a low level to a high level, this ascending edge releasing the logic circuit 82, at the occurrence of the first monostable which is characterized by its duration $\gamma$; from this instant very close to $t_2$ the interruptor 57 is opened under the action of the fourth conductor 83 which stops charging of the capacitor 55 and fixes the output 60 at a frequency level varying near to $f_1+f_q$ (the DAC 76 remaining in the locked state), and the DAC 77 is released (first conductor 83) which makes it possible for the phase loop to act on the inverting input of the comparator 81 in such a manner that this voltage is readjusted, which operates as a threshold values, to a value which corresponds to a frequency value equal to $f_2=f_1+f_q$ for the signal F. This mode of operation continues for an arbitrary duration: $\gamma=t_3-t_2$ (see FIG. 3) which is determined by an internal timing means in the circuit 82 (duration of the first monostable). The instant $t_3$ marks the end of $\gamma$ which triggers a new timing $\delta$ (triggering of the second monostable) during which the DAC 77 is locked, the DAC 76 is released, the interruptor 56 is closed, the capacitor 55 is discharged and the frequency f becomes near $f_1-f_q$, the interruptor 57 remaining open. During this operational stage, the operational amplifier 53 functions as an amplifier follower having unity gain (total negative feedback) and the phase loop maintains the value equal to: $f_o=f_1-f_q$. Preferably, the output signals of the DACs 76 and 77 are readjusted in order that the frequency values $f_2$, which correspond to the voltage $V_2$ (FIG. 3) and $f_o$, respectively corresponding to the voltage $V_1$ are obtained from the digital values close to zero at the input of the DACs 76 and 77, respectively. For this purpose a resistor 86 and a potentiometer 87 are tapped in series from the end of the resistor 78 next to the comparator 81 and a resistor 88 and a potentiometer 89 at the corresponding end of the resistor 85. This enables a rapid adjustment of the value of $\Delta F$ to the value: $f_2-f_o=2f_q$, particularly as far as the limitation of F to the value of the superior plateau of the frequency $f_2$ is concerned, as will be explained hereinafter. On the other hand, this measure makes it possible to optimize the control range of the phase loops by rendering it as large as possible, provided that the zero value is located in the middle of the coding scale selected for the DACs 76 and 77.

It should be noted that during the durations $\gamma$ and $\delta$ the frequency of the output signal of the mixer 61 remains substantially constant and equal to $f_q$. The end of $\delta$, at $t_o$, is evidenced by a descending edge at the output of the second monostable circuit, which entails opening of the interruptor 56, closing of the interruptor 57 and locking of the DAC 77. This results therefore in the same configuration which was already in existence just before the instant $t_2$, that is to say in the phase of the cycle during which the phase loop is inhibited and in which the operational amplifier 53 functions as a slope generator. During the duration extending from $t_o$ to $t_2$, the frequency f increases linearly from $f_o$ to $f_2$, while the frequency of the output signal of the mixer 61 is first equal to $f_1-f$ and thereafter, after having passed through zero, equal to $f-f_1$, and the cycle restarts.

It will be noted that during this mode of operation the correction made by the phase loop takes into account at the instant $t_3$, at the moment the DAC 77 is locked and does not exercise its influence until the instant $t_2$ which marks the beginning of the following cycle. During the duration $\gamma$ the frequency of the signal F, which is near $f_2$, is independent of fluctuations of the signal at the inverting input of the comparator 81. This means that a duration which may attain several dozen times the duration of a cycle (T+$\gamma$+$\delta$) is necessary to adjust the frequency f to the value $f_2$ during the plateau $\gamma$ of each cycle, with a precision to the order of $10^{-5}$ to $10^{-7}$ in the preferred case where the oscillators 63 and 75 are quartz oscillators. This duration is shortened by accurately presetting the DAC 77 by means of the potentiometer 87, which makes it inter alia possible to impart the best possible sensitivity to the DAC when care is taken that the elementary voltage level at the output of the DAC 77 is as low as possible and causes a discrete frequency variation which is less than the frequency errors of the oscillators 63 and 65. If the duration of a cycle is, for example, 10 ms, a period of time of the order of one second may be necessary to adjust the frequency f to the value $f_2$ during the plateau $\gamma$ of each cycle, which is permissible for the majority of applications, but, in contrast therewith, for a cycle of 500 ms a period of time of the order of one minute may be considered as being too long. It should be noted that certain elements of the arrangement may be subjected to drifts in temperature of deviations due to aging, the VCO 1 in particular. In this case, in spite of inaccurate presetting of the DAC 77 by means of the potentiometer 87, the time for adjusting F to the value $f_2$ becomes longer and it may prove to be necessary to occasionally reeffect this setting.

In contrast therewith, adjusting F to the value: $f_o = f_1 - f_q$ during the duration $\delta$ of each cycle is effected in a quasi-instantaneous manner during the duration $\delta$ itself, that is to say in some milliseconds approximately, in view of the direct relooping of the second phase loop via the DAC 76, the operational amplifier 53 and the VCO 1. The interruptors 56 and 57 of FIG. 5a are preferably field effect transistors which are driven by means of their gate, from the logic circuit 82 via third and fourth outputs 83 which are the sources of logic signals which are suitable to operate the adequate switching sequence for the interruptors 56 and 57 as described above. In the radar shown in FIG. 5a the signals Fb and DDS are taken off as described with reference to FIG. 1, and the signal DE is taken from the fourth output 83, which controls opening and closing of the interruptor 57. Depending on the type of logic utilized in 83, 56 and 57 it may be necessary to supplement the logic signal derived from the fourth output 83 by means of an inverter in order to obtain the signal DE shown in FIG. 3. The values $\Delta F = 2f_q$ and $f_o = f_1 - f_q$, which are predetermined and obtained with precision may consequently be introduced as constants in the calculating device (right-hand portion) of FIG. 2.

In order to obtain stabilization of $\Delta F$ at the very precise value required during each cycle, it is possible to make the action of the phase loop symmetrical during the plateaus of the durations $\gamma$ and $\delta$, by means of a slightly more complicated construction of the radar of FIG. 5a and a partial modification of the switching sequence of the interruptors 56 and 57. This variation of the radar is not shown, but with reference to the circuit diagram of FIG. 5a consists of connecting the junction point of the resistors 85 and 88 to the non-inverting input 59 of the operational amplifier 53 via the source-drain path of a field effect transistor whose gate may be controlled by the first conductor 83 which is connected through the output of the first monostable circuit incorporated in the circuit 82. In a symmetrical manner the junction point of the resistors 78 and 86 is connected to the non-inverting input 59 of the operational amplifier 53 via the source-drain path of the field effect transistor whose gate is controlled by the signal which is complementary to the signal on the first conductor 83. For the control of the interruptors 56 and 57 the output of each monostable circuit is connected to an input of an OR-gate whose output directly controls one of the interruptors 56, 57 and, after the signal has been supplemented, the other interruptor. Thus, a mode of operation is obtained which is identical to the preceding one as far as the phases of the duration $\delta$ and $t_o$ to $t_2$ are concerned, the operation during the duration $\gamma$ becoming similar to the operation during the duration $\delta$ because of the fact that the phase loop now acts directly at the input 59 via the DAC 77. In this case, the logic states of the interruptors 56 and 57 are complementary, the interruptor 57 being closed and the interruptor 56 being opened during the slope of the sawtooth and 57 opened, 56 closed during the plateaus which separate two consecutive slopes. The descending edge at the output of the first monostable (instant $t_3$) triggers, for example, the calculation of $d_2$ in the microprocessor.

Figure 5B:
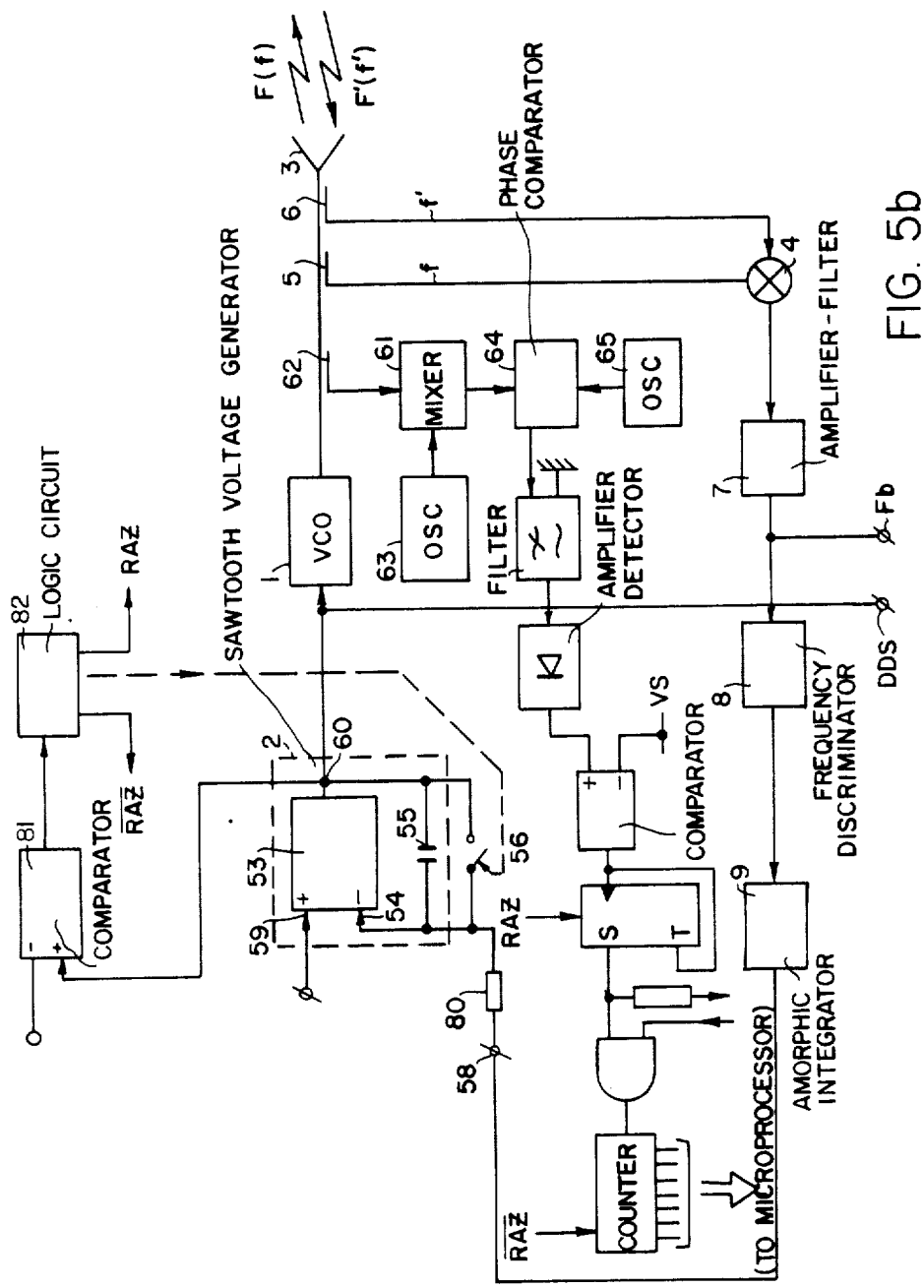

It is alternatively possible, in order to obtain the values of $\Delta F$ and $f_o$ with a very high precision to get rid of the plateaus which separate the slopes of the sawtooth and of the action of the phase loop described above, provided the points $(f_o, t_o)$ and $(f_2, t_2)$ which mark the ends of the slope of each sawtooth of the curve $F(t)$ are determined in a very accurate manner. For this purpose, as shown in FIG. 5b, the elements 61 to 65 of FIG. 5a are maintained, the elements 73 to 79 and 83 to 89 are omitted and the output of the phase comparator 64 is connected to a microprocessor via an amplitude detector, a comparison circuit with respect to a voltage and shaping threshold and a digital counter which also receives the clock signal and the reset-to-zero signal RAZ. In an advantageous manner, this microprocessor is the same as the microprocessor which effects the calculations described with reference to the right-hand portion of FIG. 2.

Figure 6:
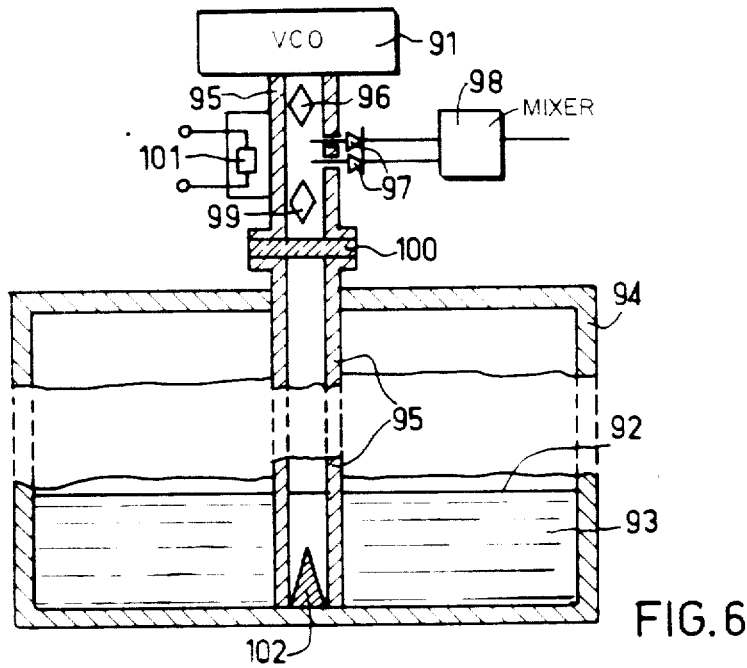
FIG. 6 shows, by means of a cross-sectional view, the container being shown partly only, the use of the invention in an arrangement for the accurate measurement of the height of a liquid in a container.

The use of the invention for accurate short-range measurement will now be described with reference to FIG. 6. The reference numeral 91 denotes a VCO having a yttrium garnet oscillator, associated with one of the radars described in the foregoing. The application of the invention consists in measuring the height of the level 92 of a liquid 93 in a container 94, which is only partly shown in the Figure. The liquid is, for example, liquid hydrogen and the distance to be measured lies, for example, between 1.5 m and 8 m. A wave guide 95, having a length which exceeds the height of the container connects the output of the VCO 91 to the bottom of the container, which constitutes an advantageous equivalent of the transmitting-receiving aerial 3 (FIGS. 1 and 5). An opening, not shown, is provided in the lower portion of the waveguide to make it possible for the liquid to penetrate into the interior of the guide. The power emitted by the VCO is of the order of 5 mW. A first 3 dB attenuator in the form of a carbon strip is arranged between the VCO 91 and diodes 97 which function as couplers (5, 6) reception reception, acting as a protection against parasitic reflections. The diodes 97 have their cathodes connected to a mixer 98 of a known type, for example a mixer $5\lambda/4$. Coupling of the two diodes gives each of them a local oscillation of approximately 0.5 mW. The remaining power (approximately 1.5 mW) leaves the wave guide after a second attenuation by 6 dB by an attenuator 99 and passes through a radar dome of a dielectric material, which is symbolically shown by reference 100. The portion of the waveguide located between the attenuators 96 and 99 may be brought to a predetermined temperature by means of a heating resistor 101.

In the portion of the wave guide located inside the container, the target is in the form of either a fine copper strip approximately 0.01 mm thick which is kept at the presurface of the liquid by means of the surface tension, or preferably by the presurface of the liquid itself. In order to avoid parasitic reflections at the bottom of the container, the waveguide is terminated, at its lower end with an adaptive impedance load, or, still better, it ends in an oblique metallic conductor 102 which has for its function to laterally discharge any energy which is not reflected from the presurface of the liquid.

For a better understanding, the VCO 91 emits, for example, a signal F which is linearly modulated between $f_o=10$ GHZ and $f_2=12$ GHz, that is to say: $\Delta F=f_2-f_o=2$ GHz. The frequency value corresponds respectively for the frequencies of the quartz oscillators 63 and 65 (FIG. 2) to:

$f_1=11$ GHz
$f_q=1$ GHz.

The central frequency $f_{bo}$ of the frequency discriminator (8), FIG. 1 or 5a (is equal to 100 Hz).

The distance d to be measured being between 1.5 m and 8 m, the duration T of the sawtooth is between 200 ms and 1066 ms $(T=2d\Delta F/\Delta f_b)$.

If moreover it is taken that:

$d\phi_{bo}=d\zeta=10°$
$T=1.1\ T_1$

It is found, by virtue of formula (15): d $d_1=4.6$ mm and, by virtue of the formula (19): d $d_2=0.417$ mm.

What is claimed is:

1. A method for accurately determining the distance d of an object from a continuous wave FM range measuring apparatus comprising a voltage controlled oscillator (VCO) for generating a high frequency signal F having an instantaneous frequency f which is linearly modulated by means of a signal generator which applies to the VCO a sawtooth voltage signal having a ramp of duration T during which the signal F undergoes a linear frequency change of a predetermined value $\Delta F$, an aerial for transmitting the signal F and receiving a reflection signal F′ from the object, and a mixer for receiving the transmitted signal F and the received signal F′ having an instantaneous frequency f′, said mixer producing a signal $F_b$ having a frequency $f_b$, said method comprising the following steps during the duration T:

(a) measuring the frequency $f_o$ of the signal F and the phase $\phi_{bo}$ of the signal $F_b$ at an instant $t_o$;

(b) determining the integral number of N periods of the signal $F_b$ and their total duration $T_1$ occurring during the duration T;

(c) calculating the approximate value of d, designated $d_1$, from the values of $\Delta F$, T, N and $T_1$;

(d) calculating the approximate value of $\phi$, designated $\phi_1$, which is approximately the phase shift between the transmitted and received signals, from the values of $f_o$ and $d_1$;

(e) determining the angle $2k\pi$, k being an integer, actually contained in the phase shift $\phi$, from the values of $\phi_{bo}$ and $\phi_1$;

(f) determining the accurate value of $\phi$, designated $\phi_2$, by calculating the sum: $\phi_{bo}+2k\pi$; and (g) calculating the accurate value of d, designated $d_2$, from the values of $f_o$ and $\phi_2$.

2. A method for accurately determining the distance d as in claim 1, where the duration T of each sawtooth ramp is predetermined.

3. A method for accurately determining the distance d as in claim 1, by using a continuous wave FM range measuring apparatus having a control loop arranged between the mixer output and the input of the signal generator input for keeping the frequency $f_b$ of the output signal $F_b$ of the mixer substantially constant, said method comprising the additional step of accurately measuring the duration T of the sawtooth ramp.

4. In a continuous wave FM range measuring apparatus for accurately determining the distance d from the apparatus to an object, said apparatus comprising a voltage controlled oscillator (VCO) for generating a high frequency signal F having an instantaneous frequency f which is linearly modulated by means of a signal generator for applying to the VCO a sawtooth voltage signal having a ramp of duration T during which the signal F undergoes a linear frequency change of a predetermined value $\Delta F$, an aerial for transmitting the signal F and receiving a reflection signal F′ from the object, and a mixer for receiving the transmitted signal F and the received signal F′ having an instantaneous frequency f′ said mixer producing a signal $F_b$ having a frequency $f_b$, wherein the improvement comprises:

(a) first means for shaping the signal $F_b$ to form a square-wave signal A having the same phase and the same frequency $f_b$;

(b) second means for measuring the phase $\phi_{bo}$ of the square-wave signal of the frequency $f_b$ at an instant in which the frequency f of the signal F is equal to a predetermined value $f_q$;

(c) third means for determining the integral number N of square-wave cycles of the signal A occurring during the duration T and for determining their total duration $T_1$; and (d) fourth means for calculating the distance d from the values of $\Delta F$, $\phi_{bo}$, $f_q$, N, $T_1$ and T measured during a ramp of the sawtooth, the calculation being effected during the time interval separating two consecutive ramps.

5. A range measuring apparatus as in claim 4, said apparatus including detection means for detecting the instant $t_2$ at which the signal F reaches a predetermined constant frequency equal to $f_1+f_q$ and for detecting the instant $t_o$ at which the signal F reaches a predetermined frequency equal to $f_1-f_q$, said detection means comprising:

(a) a first oscillator for producing a signal having the frequency $f_1$;

(b) a second oscillator for producing a signal having the frequency $f_q$;

(c) a mixer having a first input for receiving the signal F, a second input for receiving from the first oscillator the signal of the frequency $f_1$, and an output at which a signal having a frequency equal to $f-f_1$; and (d) a phase comparator having a first input for receiving from the mixer the signal of frequency $f-f_1$ and a second input for receiving from the second oscillator the signal of frequency $f_q$.

6. A range measuring apparatus as in claim 5 where the ramp of each sawtooth produced by the signal generator is followed by a first plateau and preceded by a second plateau, characterized in that said apparatus includes a control loop comprising, arranged in cascade following the phase comparator:

(a) an amplifier-filter;
(b) an analog-to-digital converter (ADC);
(c) a junction point; and
(d) first and second digital-to-analog converters (DACs), each having an input connected to the junction point and said second DAC having an output connected to an input of the signal generator;

said control loop further comprising in cascade following the first DAC:

(1) a comparator;
(2) a logic circuit; and
(3) switching and locking means connected to the first and second DACs and to the signal generator for determining the duration $\gamma$ of the first plateau and the duration $\delta$ of the second plateau.

7. A range measuring apparatus as in claim 6 where the comparator following the first DAC includes a first input connected to an output of the first DAC and a second input connected to an output of the signal generator, and where the signal generator includes an operational amplifier having an inverting and a noninverting input connected to the output of the second DAC;

said control loop effecting adjustment of a voltage applied by the first DAC to the first input of the comparator during the first plateau, and effecting adjustment of a voltage applied by the second DAC to the noninverting input during the second plateau.

8. A range measuring apparatus as in claim 7 where the control loop includes means for electrically coupling the output of the signal generator to the inverting input of the operational amplifier during at least part of the duration of each plateau.

9. A range measuring apparatus as in claim 5 comprising, arranged in cascade following the phase comparator:

(a) an amplitude detector;

(b) a signal shaping circuit for producing pulses when the frequencies of the input signals received by the phase comparator are equal;

(c) a digital counter to which the pulses are applied; and (d) a microprocessor for determining the occurrences of the instants $t_o$ and $t_2$ and the duration T between these two instants.

10. A range measuring apparatus as in claim 4 for measuring the level of the surface of a liquid in a container, characterized in that the output of the VCO is connected to the bottom of the container by means of a waveguide extending from the VCO to the bottom of the container, said waveguide containing, arranged in cascade from the VCO, a first attenuator, a first diode probe for coupling to the transmitted signal, a second diode probe for coupling to the reflection signal, a second attenuator, a dielectric wall for sealing the portion of the waveguide extending back to the VCO, and, near the bottom of the container, an element for eliminating parasitic reflections of the transmitted signal from the bottom of the container, said waveguide further including an opening for enabling entry of the liquid into the unsealed portion of the waveguide to the level to be measured, the surface of the liquid in the waveguide acting as a reflector for the transmitted signal.

* * * * *